United States Patent [19]

Breininger et al.

[11] 4,170,461

[45] Oct. 9, 1979

[54] HEAT TREATMENT OF ELECTROLESSLY DEPOSITED CUPROUS OXIDE COATING

[75] Inventors: J. Shannon Breininger, Gibsonia; Charles B. Greenberg, Murrysville, both of Pa.

[73] Assignee: PPG Industries, Inc., Pittsburgh, Pa.

[21] Appl. No.: 755,371

[22] Filed: Dec. 29, 1976

[51] Int. Cl.$^2$ .................... C03C 17/00; C03C 25/02
[52] U.S. Cl. .................... 65/60 D; 427/305; 427/372 R; 427/404; 427/419 A
[58] Field of Search ........... 427/372 R, 376 R, 376 A, 427/383 A, 383 B, 383 R, 430 A, 430 B, 431, 304, 305, 306, 165, 419 A, 404; 65/60 D

[56] References Cited

U.S. PATENT DOCUMENTS

| | | | |
|---|---|---|---|
| 2,532,283 | 12/1950 | Brenner | 427/305 |
| 2,532,284 | 12/1950 | Brenner | 427/305 |
| 2,956,900 | 10/1960 | Carlson et al. | 427/306 |
| 3,377,174 | 4/1968 | Torigai et al. | 427/430 A |
| 3,457,138 | 7/1969 | Miller | 427/305 |
| 3,485,643 | 12/1969 | Zeblisky et al. | 427/306 |
| 3,511,681 | 5/1970 | Huey | 427/372 R |
| 3,671,291 | 6/1972 | Miller et al. | 106/1 |
| 3,694,250 | 9/1972 | Grunwald et al. | 427/305 |
| 3,694,299 | 9/1972 | Wagner | 65/24 |
| 3,708,329 | 1/1973 | Schoenberg | 427/306 |
| 3,846,152 | 11/1974 | Franz | 148/6.3 |
| 3,920,864 | 11/1975 | Greenberg et al. | 427/304 |
| 3,944,440 | 3/1976 | Franz | 427/305 |
| 3,978,272 | 8/1976 | Donley | 427/314 |
| 4,002,786 | 1/1977 | Hirohata et al. | 427/306 |

*Primary Examiner*—Michael F. Esposito
*Assistant Examiner*—S. L. Childs
*Attorney, Agent, or Firm*—Donna L. Seidel

[57] ABSTRACT

A wet chemical method for the direct deposition of cuprous oxide onto a transparent nonmetallic substrate such as glass wherein the electrolessly deposited cuprous oxide film is heated to effect a change in the color of transmitted light is disclosed.

4 Claims, No Drawings

HEAT TREATMENT OF ELECTROLESSLY DEPOSITED CUPROUS OXIDE COATING

CROSS REFERENCE TO RELATED APPLICATIONS

The present invention is related in subject matter to U.S. Ser. No. 755,369, entitled "Direct Electroless Deposition of Cuprous Oxide Films", filed on even date herewith by the present applicants.

BACKGROUND OF THE INVENTION

1. Field of the Invention

The present invention relates generally to the art of electroless deposition and particularly to the direct deposition of cuprous oxide. The present invention also relates specifically to multiple-glazed units with a cuprous oxide coating on at least one surface.

2. Description of the Prior Art

Transparent articles bearing transparent metal films have been produced by well-known electroless coating techniques which involve contacting a surface to be coated with a metal salt and a reducing agent to deposit a metal film onto the surface by chemical reduction.

Autocatalytic techniques wherein a metal salt and a reducing agent are present in a single solution and react upon contact with a catalytic surface are described in U.S. Pat. Nos. 2,532,283 and 2,532,284 for the deposition of cobalt and U.S. Pat. No. 2,956,900 for the deposition of nickel. Exhaustive techniques wherein the metal salt and reducing agent react rapidly and so are applied to the surface to be coated in separate solutions are described in U.S. Pat. No. 3,671,291.

Such electroless coating techniques have been successfully employed for the direct deposition of thin transparent metallic films of iron, cobalt, nickel, copper, silver and mixtures thereof on nonmetallic substrates such as sheets of glass. The films so produced have suitable transmittance, reflectance and uniform thickness to provide coated articles with important solar energy control characteristics and a uniform aesthetic appearance.

Electrolessly deposited metal films may be oxidized in order to obtain optical and spectral properties which differ from the properties of the initially deposited metals. In U.S. Pat. No. 3,846,152, articles for the selective reflectance and transmittance of radiation over an extended spectral range are disclosed. Such articles are produced by coating a substrate with a first film of silver, iron, cobalt, chromium or nickel; coating with a second metal film of copper or iron; and oxidizing the second metal film by heating.

In U.S. Pat. No. 3,920,864 a method is disclosed for treating a copper-coated article with a solution which effects partial replacement of copper by silver. The copper-silver composite film is subsequently oxidized by exposure to moist air.

As an alternative to the subsequent oxidation of electrolessly deposited metal films, a method is disclosed in U.S. Pat. No. 3,978,272 for the direct deposition of metal oxide films. Such films are deposited by spraying a solution of a metal compound onto the substrate which is sufficiently hot to thermally decompose the metal compound thus forming a metal oxide film by pyrolysis.

In U.S. Pat. No. 3,694,299, a method is described, wherein an organometallic film forming material is deposited on a surface of a glass sheet which is assembled with another glass sheet to form a multiple glazed unit and is heated to form a metal oxide film on the interfacial surface of the glass sheet prior to fusing the edges of the glass sheets to form a welded multiple glazed unit.

SUMMARY OF THE INVENTION

A cuprous oxide film is deposited onto a transparent nonmetallic substrate such as glass by chemical reduction from an electroless coating solution of a copper salt and a reducing agent; the pH of the solution being maintained above about 12.9. The criticality of the pH apparently involves complexation of the cupric ions by hyroxide ions. An additional complexing agent acts as a secondary complexer to prevent bulk precipitation of copper hydroxide.

Deposition of a transparent cuprous oxide film onto a transparent silver activated glass substrate provides a coated glass article which appears blue-green at the film surface, yellow-green at the glass surface, and greenish by transmission. In accordance with the present invention, transparent cuprous oxide coated articles are heat treated to effect an alteration in the color of transmitted light and a reduction in the reflectance from the uncoated glass surface.

Cuprous oxide coated glass may be fabricated into a glass edge multiple glazed unit. During the welding and annealing processes, the appearance of the article is altered. The color of transmitted light changes from greenish to brown and the luminous reflectance from the uncoated glass surface decreases significantly.

The decrease in reflectance may be attributable to oxidation of the underlying silver or to mutual diffusion of the silver and cuprous oxide.

DESCRIPTION OF THE PREFERRED EMBODIMENTS

Large sheets of glass, preferably soda-lime-silica glass about 7/32 inch thick, are cleaned by conventional procedures, preferably a blocking operation carried out with rotating felt blocks which gently abrade the glass surface with an aqueous slurry of a commercial cleaning compound, preferably cerium oxide. A suitable continuous line apparatus for washing, rinsing and sweeping the surface is shown in U.S. Pat. No. 3,723,158.

The surface to be coated is contacted with a dilute aqueous solution of a sensitizing agent, preferably 0.01 to 1.0 grams per liter of stannous chloride. The sensitized surface is preferably activated by depositing on it a thin catalytic silver film, preferably by contacting the sensitized surface with an alkaline solution of ammoniacal silver nitrate and a solution of a reducing agent, preferably dextrose. The thickness of the silver film preferably reduces the luminous transmittance of the sheet to about 40 to 80 percent. It is important that the silver film be substantially free from silver oxide as the presence of the oxide appears to favor deposition of copper in the subsequent coating step. Therefore, if it is likely that the silver film has undergone significant oxidation prior to the cuprous oxide coating step, it is preferred to rinse the activated surface with a dilute solution of an oxide inhibitor such as sodium borohydride, ammonium polysulfide, formaldehyde, or preferably sodium thiosulfate.

The silver activated surface is contacted with an electroless plating bath comprising a copper salt, a complexing agent, a reducing agent and sufficient alkali to raise the pH above about 12.9, as described in U.S. Pat. Ser. No. 755,369, entitled "Direct Electroless Deposition of Cuprous Oxide Films" which is incorporated herein by reference. The preferred copper salt is copper sulfate and the preferred complexing agent is Rochelle salt, sodium potassium tartrate, although other complexing agents such as gluconic, citric, malic and lactic acids and their alkali metal salts may be used. Formaldehyde, particularly a 37 percent aqueous solution is a preferred reducing agent, although other common reducing agents such as dextrose or hydrazine sulfate can be used. The preferred alkali is sodium hydroxide.

In a most preferred embodiment, a silver activated glass substrate is contacted for several minutes at ambient temperature with an aqueous solution comprising per liter about 2-5 grams copper sulfate
15-40 milliliters formaldehyde solution
1-5 grams Rochelle salt and sufficient sodium hydroxide to maintain the pH of the solution above about 12.9. Contacting a silver-activated glass substrate having a luminous transmittance of about 50 percent with such a solution for sufficient time to deposit a cuprous oxide film of sufficient thickness to lower the luminous transmittance to about 10 to 40 percent results in a cuprous oxide coated article which appears blue-green at the film surface, yellow-green at the glass surface and greenish by transmission. The most preferred coated glass sheets prepared in accordance with the present invention have, in addition to a luminous transmittance of about 10 to 40 percent, a luminous reflectance of about 10 to 40 percent from the film surface and a luminous reflectance of about 30 to 60 percent from the glass surface. The coated sheets are then heated, preferably at a temperature of at least about 300° F., and more preferably, above about 600° F., for sufficient time to effect a change in the color of transmitted light and a significant reduction in the reflectance from the uncoated glass.

In a preferred embodiment of the present invention, such a coated glass sheet may be fabricated into a welded multiple glazed unit by a typical method such as disclosed in U.S. Pat. No. 2,624,979. A coated sheet is assembled with a second glass sheet, preferably with the coated surface as the second surface. Preferably the top sheet is slightly larger than the other. The slightly larger sheet is striped about its periphery with an electrically conductive material, preferably colloidal graphite, by a method such as disclosed in U.S. Pat. No. 2,999,036.

The glass assembly is preheated to avoid thermal shock during the subsequent welding operation. Preferably, the assembly is heated to about 600° to 800° F. by maintaining it in a preheated furnace for about 40 seconds to 3 minutes in an atmosphere having a temperature of about 1300° to 1400° F. The assembly is then conveyed to a welding furnace, where the ambient temperature is about 800° to 850° F. The glass sheets are held in position by vacuum chucks within the furnace which are effective to provide a slight separation between the sheets.

An electric current is passed through the stripe of electrically conductive material thereby heating the portion of the larger glass sheet which extends beyond the periphery of the smaller glass sheet. Heating is continued until the periphery of the larger sheet reaches its softening temperature and sags into contact with and becomes welded or fused to the periphery of the smaller sheet. The vacuum chuck supporting the top sheet is moved upwardly to separate the sheets in order to provide an air space between the sheets in the final welded multiple glazed unit.

The unit is held in position until the temperature of the glass is below the softening point. Then the unit is transferred to a lehr oven for annealing and cooling. Finally, the unit is purged with dry air or an insulating gas and hermetically sealed. The welded multiple glazed unit appears brown by transmittance.

The present invention will be further understood from the descriptions of the specific examples which follow.

EXAMPLE I

Flat sheets of clear soda-lime-silica glass are cleaned and sensitized with an aqueous solution of 0.5 gram per liter stannous chloride. The sensitized suface is contacted for 25 seconds at ambient temperature with an alkaline aqueous solution containing 2.1 grams per liter silver nitrate, 10 milliliters per liter ammonium hydroxide (28 percent aqueous solution), and 0.32 grams per liter sodium hydroxide, and a solution of 2.6 grams per liter dextrose to deposite a thin catalytic silver film which lowers the luminous transmittance of the glass sheet to about 50 percent.

The silver-activated surface is rinsed with a solution of 0.1 gram per liter sodium thiosulfate and contacted for 3½ minutes at ambient temperature with a solution containing 3.8 grams per liter copper sulfate, 29 milliliters per liter formaldehyde (37 percent aqueous solution), 3 grams per liter Rochelle salt and 25 grams per liter sodium hydroxide to deposit a cuprous oxide film.

The cuprous oxide coated sheet appears blue-green at the film surface with a reflectance of about 30 percent, yellow-green at the glass surface with a reflectance of about 44 percent, and greenish by transmission with a luminous transmittance of about 24 percent.

The cuprous oxide coated sheet is heated to 900° F. for 15 minutes in order to simulate the temperature conditions of a glass edged multiple glazed unit fabrication method. After such heat treatment, the reflectance from the uncoated glass surface is decreased to 23 percent and the article appears brown by transmission.

EXAMPLE II

A glass sheet is cleaned, sensitized, activated and rinsed as in Example I except that the silver and reducing solutions are applied for about 30 seconds resulting in a luminous transmittance of 46.5 percent. The silver-activated substrate is contacted for 3 minutes with a solution containing 3.8 grams per liter copper sulfate, 29 milliliters per liter formaldehyde solution, 3 grams per liter Rochelle salt and sufficient sodium hydroxide to bring the pH to 13.7.

A uniform cuprous oxide film is deposited. The coated article has a luminous transmittance of 24.7 percent, luminous reflectance from the coated surface of 28.9 percent, and luminous reflectance from the glass surface of 49.8 percent. The color appearance of the article, according to the conventions of the Inter-Society Color Council, National Bureau of Standards (see ISCC-NBS Color Name Charts Supplement to NBS Circulor 553), is light olive by transmission.

The cuprous oxide coated sheet is heat treated as in Example I. The reflectance from the uncoated glass surface is decreased to 22.6 percent and the color appearance of the article, according to the ISCC-NBS conventions, is light olive brown.

Various modifications of the present invention will become known to those skilled in the art. Such modifications fall within the spirit of the present invention and are intended to be within its scope as defined by the following claims.

We claim:

1. In a wet chemical method for directly depositing cuprous oxide onto a receptive surface of a nonmetallic substrate comprising contacting the receptive surface with a solution of copper salt, reducing agent and sufficient alkali to raise the pH of the solution above about 12.9 to deposit a film consisting essentially of cuprous oxide on the surface, the improvement which comprises subsequently heating the cuprous oxide coated article at a temperature of at least about 300° F. but below the melting point of the substrate.

2. The improved method according to claim 1, wherein the receptive surface is a transparent glass surface and is contacted with a solution comprising
   2-5 grams per liter copper sulfate;
   15-40 milliliters per liter formaldehyde solution;
   1-5 grams per liter Rochelle salt; and
sufficient alkali metal hydroxide to raise the pH above about 12.9 for a period of about 1 to 5 minutes at ambient temperature to produce a transparent cuprous oxide coated article which appears greenish by transmission and wherein the cuprous oxide coated article is heated sufficiently to effect a change in the color of transmitted light from greenish to brown.

3. The improved method according to claim 2, wherein the cuprous oxide coated article is heated at a temperature of at least about 600° F. but below the softening temperature of the glass.

4. The improved method according to claim 3, wherein the cuprous oxide coated glass is assembled in a multiple glazed unit and is heated during the welding operation.

* * * * *